United States Patent
Zeng et al.

(10) Patent No.: US 10,906,813 B2
(45) Date of Patent: Feb. 2, 2021

(54) FUNCTIONALIZED CARBON NANOTUBES AND METHODS

(71) Applicant: Florida State University Research Foundation, Inc., Tallahassee, FL (US)

(72) Inventors: Changchun Zeng, Tallahassee, FL (US); Yan Li, Tallahassee, FL (US); Zhiyong Liang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 313 days.

(21) Appl. No.: 16/143,878

(22) Filed: Sep. 27, 2018

(65) Prior Publication Data

US 2019/0092640 A1    Mar. 28, 2019

Related U.S. Application Data

(60) Provisional application No. 62/564,543, filed on Sep. 28, 2017.

(51) Int. Cl.
*C01B 32/174* (2017.01)
*G01L 1/20* (2006.01)
(Continued)

(52) U.S. Cl.
CPC .............. *C01B 32/174* (2017.08); *G01L 1/20* (2013.01); *B82Y 15/00* (2013.01); *B82Y 30/00* (2013.01);
(Continued)

(58) Field of Classification Search
CPC .............. C01B 32/174; C01B 2202/02; C01B 2202/06; C01B 32/158; C01B 32/159; C01B 32/16; C01B 32/162; C01B 32/164; C01B 32/166; C01B 32/168; C01B 32/17; C01B 32/172; C01B 32/176; C01B 32/178; C01B 2202/00; C01B 2202/04; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; G01L 1/20; C01P 2004/133; C01P 2002/88; C01P 2002/82; B82Y 15/00; B82Y 30/00; B82Y 40/00; Y02P 20/54

See application file for complete search history.

(56) References Cited

U.S. PATENT DOCUMENTS

2011/0190544 A1*   8/2011   Navarrini ................ C01B 32/15
                                                                568/591

OTHER PUBLICATIONS

Fifield, et al., Noncovalent Functionalization of Carbon Nanotubes with Molecular Anchors Using Supercritical Fluids, J. Phys. Chem. B. 2004; 108: 8373-8741 (Year: 2004).*

(Continued)

*Primary Examiner* — Daniel C. McCracken
(74) *Attorney, Agent, or Firm* — Eversheds Sutherland (US) LLP (57) ABSTRACT

Provided herein are methods off functionalizing a carbon nanotube, functionalized carbon nanotubes, methods of forming a suspension, and methods of forming a sensor. The methods may include contacting one or more carbon nanotubes with a dienophile in the presence of a supercritical fluid to form one or more functionalized carbon nanotubes. The one or more functionalized carbon nanotubes may have a degree of functionalization of about 1% to about 5%.

24 Claims, 7 Drawing Sheets

(51) Int. Cl.
*B82Y 15/00* (2011.01)
*B82Y 30/00* (2011.01)
*B82Y 40/00* (2011.01)

(52) U.S. Cl.
CPC .......... *B82Y 40/00* (2013.01); *C01B 2202/02* (2013.01); *C01B 2202/06* (2013.01); *C01P 2002/82* (2013.01); *C01P 2002/88* (2013.01); *C01P 2004/133* (2013.01)

(56) References Cited

OTHER PUBLICATIONS

Felix et al., "High-Resolution Patterning of Molecular Glasses Using Supercritical Carbon Dioxide," Adv. Mater., 2006, 18:442-446.
Johnston et al., "Making Nanoscale Materials with Supercritical Fluids," Science, 2004, 303:482-483.
Li et al., "Low-Temperature CO2-Assisted Assembly of Cyclic Olefin Copolymer Ferroelectrets of High Piezoelectricity and Thermal Stability," Macromol. Chem. Phys., 2013, 2114:2733-2738.
Li et al., "Room-Temperature, Near-Instantaneous Fabrication of Auxetic Materials with Constant Poisson's Ratio over Large Deformation," Adv. Mater., 2016, 28:2822-2826.
Ye et al., "Supercritical Fluid Fabrication of Metal Nanowires and Nanorods Templated by Multiwalled Carbon Nanotubes," Adv. Mater., 2003, 15(3):316-319.

\* cited by examiner

FUNCTIONALIZED CARBON NANOTUBES AND METHODS

CROSS-REFERENCE TO RELATED APPLICATIONS

This application claims priority to U.S. Provisional Patent Application No. 62/564,543, filed Sep. 28, 2017, which is incorporated herein by reference.

BACKGROUND

Carbon nanotubes (CNTs) have a number of unique characteristics. CNTs have been used for certain engineering applications in a nanoparticulate form (e.g., a CNT suspension) and a nano-bulk form (e.g., fiber or sheet (buckypaper)), however, the solubility and/or compatibility of CNTs with other constituents often hinders their effective integration into macroscopic process intermediates and/or final products. This can be due to the hydrophobic nature of CNT surfaces, and/or the tendency of nanotubes to form aggregates, tight bundles, or complex rigid networks as a result of van der Waals forces between the nanotubes.

Therefore, chemical modification of CNTs has been explored to tailor nanotube surfaces and/or improve CNT dispersability in common solvents and CNT compatibility with other materials. These efforts generally have fallen into two categories: covalent and non-covalent functionalization.

The former (covalent functionalization) typically relies on partially disrupting the nanotube structure to introduce covalently linked functional moieties onto the CNT surface, whereas the latter (non-covalent functionalization) utilizes chemicals (e.g., surfactants, polymers, DNAs, etc.) to form strong intermolecular interaction(s) with CNTs, sometimes without perturbing the basic nanotube structural integrity.

None of these efforts, however, has resulted in a scalable technology capable of achieving tailorable and/or controllable CNT functionalization with a high yield. Known methods frequently damage the nanotube structures and/or undesirably alter the properties of the nanotubes. For example, the oxidation of CNTs in strong acidic media or other strong oxidizing agents is commonly used to achieve covalent functionization, but this method can cause severe damage to nanotube structures. Known methods also frequently include the use of high cost and/or difficult-to-handle chemicals that are highly toxic and/or not readiliy available on an industrial scale. For example, CNT sidewall functionalization has been performed using fluorination, osmylation, and azomethineylides. Another difficulty faced with the known methods includes the need for large amounts of agents that can be costly and/or difficult to remove. For example, forming a suitable dispersion for fabricating CNT sheets for composite applications can require the use of a surfactant at an amount equal to or greater than about 10 times the weight of the CNTs. Removing the surfactant can be a tedious and/or time-consuming process. In a still further example, current functionalization methods typically are conducted in a liquid phase that includes a relatively large amount of liquid, which can result in low CNTs throughput and/or processing capability. Additional steps in recovering functionalized CNTs, such as liquid removal and/or recycling, and/or CNTs collection and drying can lead to higher costs, increased process complexity, and/or low retention of the functionalizated CNTs. Moreover, the current functionalization methods typically offer no feasible strategy for controlling the degree of functionalization.

There remains a need for methods of functionalizing CNTs that overcome one or more of the foregoing disadvantages, including methods that do not require a surfactant, allow the degree of functionalized to be controlled, achieve desirable or high yields, allow for the easy separation of functionalized CNTs from other starting materials, or a combination thereof.

BRIEF SUMMARY

Provided herein are methods of functionalizing CNTs or other nanocarbon materials that can be scalable, cost-effective, solvent-free, or a combination thereof. Embodiments of the functionalized nanotubes provided herein also may be used to form suspensions that are highly-concentrated, surfactant-free, or a combination thereof. In some embodiments, the Diels-Alder reactions of methods provided herein offer mild reaction conditions and/or permit the degree of functionalization to be controlled.

Provided herein are methods off functionalizing a carbon nanotube. In some embodiments, the methods include contacting one or more carbon nanotubes with a dienophile in the presence of a supercritical fluid to form one or more functionalized carbon nanotubes. The one or more functionalized carbon nanotubes may have a degree of functionalization of about 1% to about 5%. The dienophile, in some embodiments, is maleic anhydride. In some embodiments, the dienophile is an alkenyl succinic anhydride. In some embodiments, the supercritical fluid includes supercritical carbon dioxide.

Also provided herein are methods of forming a suspension, and suspensions. In some embodiments, the methods include disposing the one or more functionalized carbon nanotubes described herein in a liquid to form a suspension. The one or more functionalized carbon nanotubes may be present in the suspension at an amount of about 0.1% to about 25% by weight, based on the weight of the suspension. In some embodiments, the suspensions provided herein include a liquid and one or more functionalized carbon nanotubes dispersed in the liquid. The liquid may be an organic liquid, including a polar organic liquid. The liquid may include water and an organic liquid, such as N-methyl-2-pyrrolidone.

Also provided herein are methods of forming a derivative of one or more functionalized carbon nanotubes. In some embodiments, the methods provided herein include contacting one or more functionalized carbon nanotubes described herein with a reactant, wherein the reactant includes (i) ammonia, or (ii) at least one primary amine.

Also provided herein are methods of forming a sensor, and sensors. In some embodiments, the methods include providing one or more functionalized carbon nanotubes made according to the methods provided herein, and disposing the one or more functionalized carbon nanotubes on a substrate. The disposing of the one or more functionalized carbon nanotubes may include printing the one or more functionalized carbon nanotubes on the substrate. In some embodiments, the sensors include a substrate and one or more functionalized carbon nanotubes, wherein the one or more functionalized carbon nanotubes are disposed on the substrate. The sensors may be configured to provide a resistance response when (i) the sensor is subjected to a strain, or (ii) the functionalized carbon nanotubes chemically react with a gas.

Also provided herein are functionalized carbon nanotubes. The functionalized carbon nanotube may include a surface to which at least one dihydrofuran-2,5-dione moiety is covalently bonded.

DETAILED DESCRIPTION

The methods provided herein may improve the scalability of CNT functionalization, thereby faciliating the large-scale production of functionalized CNTs. In some embodiments, the methods provide increased process throughput. In some embodiments, the high diffusivity, high solvation power, and/or zero surface tension of supercritical carbon dioxide ($scCO_2$) may be leveraged to facilitate the functionalization of CNTs without pre-dispersing the CNTs into a dilute suspension. In some embodiments, a high concentration of a dienophile, such as MAH, rapidly penetrates and reaches most, if not all, nanotube surfaces within CNT agglomerates with substantially uniform dienophile concentration.

In some embodiments, the methods provided herein can be effective for either particulate CNTs or nano-bulk CNTs. This may be due to the ability of a dienophile to contact most, if not all, of the nanotube surfaces, regardless of the physical arrangement of the CNTs. Therefore, in some embodiments, the methods provided herein can be used to effectively functionalize densely packed CNT sheets or other agglomerations of CNTs.

In some embodiments, the methods provided herein provide for facile CNT recovery, which may reduce the complexity of the processes, the cost of the processes, or a combination thereof. For example, embodiments of the methods provided herein eliminate the need to remove a surfactant from a product that includes CNTs, which can be difficult. In some embodiments, separating functionalized CNTs from $scCO_2$ and an unreacted dienophile requires a simple pressure release. This may allow for easy CNT collection, with high material retention (e.g., nearly 100% material retention in some embodiments). The $CO_2$ and/or dienophile can also be recovered and reused. Therefore, the methods provided herein may be used to mass produce high quality functionalized CNTs in order to meet the needs of many emerging applications, such as high conductive ink, reinforced composites, conductive plastics, etc.

In one aspect, methods of functionalizing carbon nanotubes are provided. In some embodiments, the methods include contacting one or more carbon nanotubes with a dienophile in the presence of a supercritical fluid to form one or more functionalized carbon nanotubes.

Dienophile

The dienophile of the methods provided herein may include any molecule capable of undergoing a Diels-Alder reaction with a carbon nanotube. A carbon nanotube typically includes diene moieties, and the dienophile may be any molecule that includes a double bond (e.g., a carbon-carbon double bond) that is capable of undergoing a Diels-Alder reaction with a diene moiety of a carbon nanotube.

In some embodiments, the dienophile includes maleic anhydride.

In some embodiments, the dienophile includes an alkenyl succinic anhydride. The alkenyl succinic anhydride may be a compound of the following formula:

wherein $R^1$ and $R^2$ are independently selected from a $C_1$-$C_{20}$ hydrocarbyl.

Supercritical Fluid

The supercritical fluid used in the methods provided herein may include any supercritical fluid that is capable of hosting a Diels-Alder reaction between a carbon nanotube and a dienophile. In some embodiments, the supercritical fluid includes supercritical carbon dioxide.

In some embodiments, the contacting of one or more carbon nanotubes with a dienophile occurs at a pressure effective to provide a supercritical fluid.

In some embodiments, the contacting of one or more carbon nanotubes with a dienophile occurs at a pressure of at least 20 MPa. In some embodiments, the contacting occurs at a pressure of about 8 MPa to about 30 MPa, about 10 MPa to about 25 MPa, about 12 MPa to about 25 MPa, about 15 MPa to about 25 MPa, about 18 MPa to about 25 MPa, or about 20 MPa to about 25 MPa.

In some embodiments, the contacting of one or more carbon nanotubes with a dienophile occurs at a temperature of about 130° C. to about 250° C., about 150° C. to about 220° C., about 170° C. to about 220° C., about 190° C. to about 220° C., or about 200° C. to about 220° C.

In some embodiments, the contacting of one or more carbon nanotubes with a dienophile occurs at [1] a temperature of about 130° C. to about 250° C., about 150° C. to about 220° C., about 170° C. to about 220° C., about 190° C. to about 220° C., or about 200° C. to about 220° C., and [2] a pressure of at least 20 MPa.

In some embodiments, the contacting of one or more carbon nanotubes with a dienophile occurs at [1] a temperature of about 130° C. to about 250° C., about 150° C. to about 220° C., about 170° C. to about 220° C., about 190° C. to about 220° C., or about 200° C. to about 220° C., and [2] a pressure of about 8 MPa to about 30 MPa.

In some embodiments, the contacting of one or more carbon nanotubes with a dienophile occurs at [1] a temperature of about 130° C. to about 250° C., about 150° C. to about 220° C., about 170° C. to about 220° C., about 190° C. to about 220° C., or about 200° C. to about 220° C., and [2] a pressure of about 20 MPa to about 25 MPa.

Carbon Nanotubes (CNTs)

The one or more carbon nanotubes used in the methods provided herein may include one or more single-wall carbon nanotubes, one or more double-wall carbon nanotubes, one or more multi-wall carbon nanotubes, or a combination thereof.

The one or more carbon nanotubes used in the methods provided herein may be in any form. For example, carbon nanotubes may be in the form of a bulk material, such as a sheet (e.g., buckypaper, ribbon, etc.), a foam, a fiber (e.g., a "rope" or "thread"), or a combination thereof. As a further example, the one or more carbon nanotubes may include a plurality of individual nanotubes, which may include agglomerates of the individual nanotubes.

Functionalized Carbon Nanotubes

Figure 1:
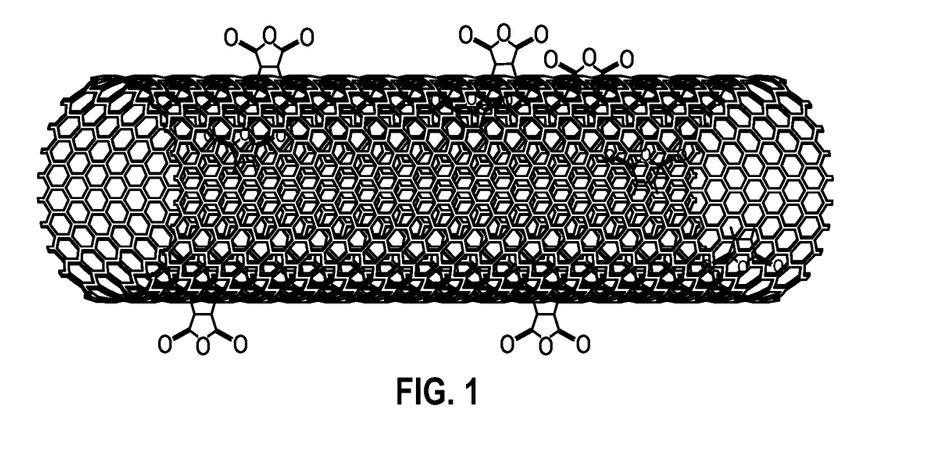
FIG. 1 depicts an embodiment of a carbon nanotube functionalized with maleic anhydride (MAH).
Figure 2:
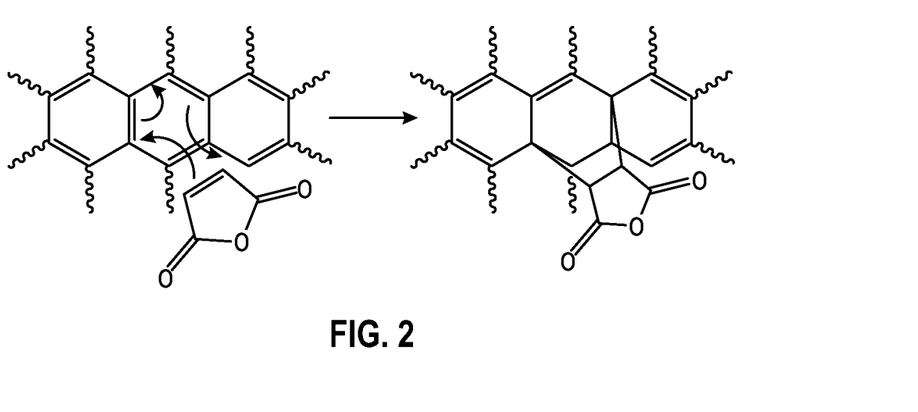
FIG. 2 depicts a possible mechanism for a Diels-Alder reaction between an embodiment of a carbon nanotube and MAH.

The functionalized carbon nanotubes that are produced by the methods provided herein may include a six-membered ring formed by the reaction of a diene moiety of a carbon nanotube and a dienophile. An example of a functionalized carbon nanotube formed by contacting a carbon nanotube and maleic anhydride in the presence of supercritical carbon dioxide is depicted at FIG. 1, and a possible reaction mechanism for the formation of the functionalized carbon nanotube of FIG. 1 is depicted at FIG. 2. The functionalized carbon nanotube of FIG. 2 includes a six-membered ring formed from [1] the two carbon atoms of the double bond of the maleic anhydride, and [2] the four carbon atoms of the diene moiety of the carbon nanotube. FIG. 1 and FIG. 2, therefore, depict an embodiment of a functionalized carbon nanotube that includes a surface to which at least one dihydrofuran-2,5-dione moiety is covalently bonded.

In some embodiments, the degree of functionalization (DF) of the one or more functionalized carbon nanotubes is about 0.1% to about 25%, about 0.1% to about 20%, about 0.1% to about 15%, about 0.1% to about 10%, about 0.1% to about 7.5%, about 1% to about 5%, about 2% to about 5%, about 3%, about 4%, or about 5%.

As used herein, the phrase "degree of functionalization" refers to the number of functional groups per 100 CNT-carbons, as calculated by the procedure described herein at Example 2.

The one or more functionalized carbon nanotubes may be subjected to at least one processing step that removes unreacted dienophile, washes the one or more functionalized carbon nanotubes, or a combination thereof.

In some embodiments, the methods provided herein include removing an unreacted dienophile from one or more functionalized carbon nanotubes. The removing of the unreacted dienophile may include contacting the one or more functionalized carbon nanotubes with carbon dioxide at a pressure of about 20 MPa to about 30 MPa and a temperature of about 80° C. to about 100° C.

In some embodiments, the methods also include washing the one or more functionalized carbon nanotubes. The washing may include contacting the one or more functionalized carbon nanotubes with a liquid, such as acetone.

Derivatives of Functionalized Carbon Nanotubes

The methods provided herein also may include contacting the one or more functionalized carbon nanotubes with a reactant to form derivatives. The reactant may include any compound that is capable of reacting with a functionalized carbon nanotube, including the functional groups added via functionalization, an un-functionalized portion of a carbon nanotube, or a combination thereof.

In some embodiments, the methods herein include contacting one or more functionalized carbon nanotubes with a reactant comprising at least one amine. In some embodiments, the methods include contacting one or more functionalized carbon nanotubes with a reactant, wherein the reactant includes (i) ammonia, or (ii) at least one primary amine. The reactant that includes at least one amine may include aniline, benzene-1,3-diamine, ethane-1,2-diamine, $N^1,N^1$-dimethylethane-1,2-diamine, pyren-1-amine, or a combination thereof.

The derivatives of functionalized carbon nanotubes provided herein may a surface to which at least one 1-($C_1$-$C_{20}$ hydrocarbyl)pyrrolidone-2,5-dione moiety is covalently bonded. In some embodiments, the $C_1$-$C_{20}$ hydrocarbyl group is selected from the group consisting of phenyl, phenyl substituted with a primary amine, ethyl substituted with a primary amine, ethyl substituted with a tertiary amine, and pyrenyl.

Suspensions

In some embodiments, the methods include combining one or more functionalized carbon nanotubes and a liquid to form a suspension. In some embodiments, the liquid includes at least one organic liquid. In some embodiments, the liquid includes at least one organic liquid and water. The water and the at least one organic liquid may be miscible. In some embodiments, the liquid is water.

The liquid may include N-methyl-2-pyrrolidone (NMP), dimethylformamide (DMF), dimethyl sulfoxide (DMSO), water, or a combination thereof. In some embodiments, the liquid is NMP. In some embodiments, the liquid is water and NMP.

Not wishing to be bound by any particular theory, it is believed that when a liquid including water and at least one organic liquid is used, the composition of the liquid (e.g., the ratio of the water:at least one organic liquid) may be adjusted to alter the viscosity of a suspension. It is believed that water may be used as the liquid to form a stable suspension with a lower maximum concentration of CNTs.

The one or more functionalized carbon nanotubes may be present in the suspension at an amount of about 0.1% to about 25%, about 1% to about 15%, about 1% to about 10%, about 1% to about 8%, about 1% to about 5%, about 2% to about 5%, or about 3% to about 5%, by weight, based on the weight of the suspension.

Sensors

In another aspect, sensors are provided. The sensors may include a substrate and one or more functionalized carbon nanotubes disposed on the substrate. The substrate may be a flexible substrate. The sensors may be configured to provide a resistance response when (i) the sensor is subjected to a strain, or (ii) the functionalized carbon nanotubes chemically react with a gas. The resistance response may be used to detect or measure (i) the strain to which a sensor is subjected, or (ii) the presence of a gas, such as ammonia. Therefore, in some embodiments, the sensors are strain sensors, including piezoresistive strain sensors. In some embodiments, the sensors are gas sensors.

The sensors may include one or more electrical contacts, which may include silver contacts. The one or more electrical contacts may include a comb-shaped contact. When the sensors includes one or more electrical contacts, the sensors may include a layer of the functionalized carbon nanotubes.

Figure 13:
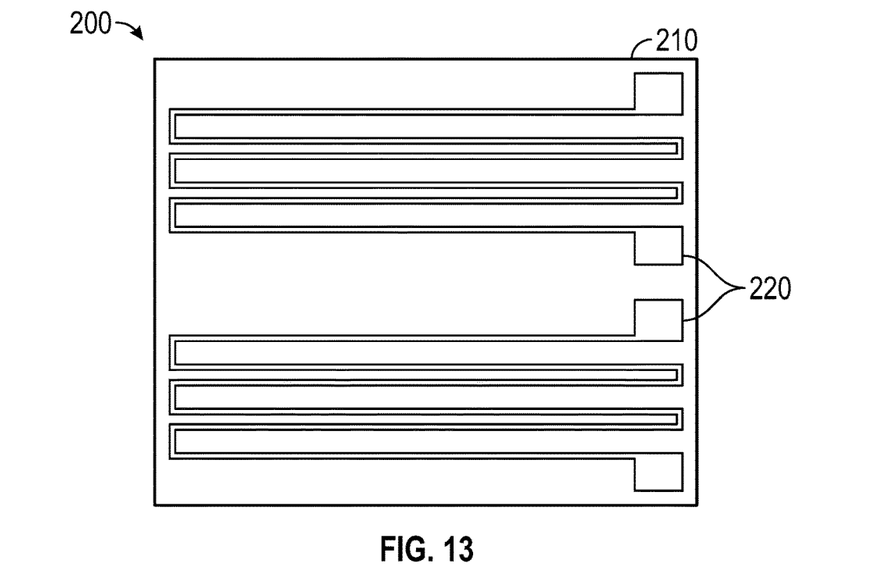
FIG. 13 depicts an embodiment of a sensor.

An embodiment of a sensor is depicted at FIG. 13. The sensor 200 of FIG. 13 includes a substrate 210, and disposed on the substrate 210 are one or more functionalized carbon nanotubes 220.

In another aspect, methods of making a sensor are provided. In some embodiments, the methods of making a sensor include providing one or more functionalized carbon nanotubes made according to any of the methods provided herein; and disposing the one or more functionalized carbon nanotubes on a substrate. The disposing of the one or more functionalized carbon nanotubes may include printing the one or more functionalized carbon nanotubes on the substrate. A 3-D printer or other type of printer (e.g., an inkjet printer) may be used to print the one or more functionalized carbon nanotubes. The one or more functionalized carbon nanotubes may be in a suspension when applied to a substrate. The suspension may include N-methyl-2-pyrrolidone (NMP), dimethylformamide (DMF), dimethyl sulfoxide (DMSO), water, or a combination thereof. The substrate generally may include any material, and, in some embodiments, includes a woven or non-woven fabric. Therefore, the CNTs may be disposed on articles of clothing, such as shirts, gloves, etc. In some embodiments, the substrate includes a thermoplastic. In some embodiments, the substrate includes a stretchable thermoplastic elastomer film. In some embodiments, the substrate includes a polyimide substrate.

The phrase "$C_1$-$C_{20}$ hydrocarbyl", and the like, as used herein, generally refers to aliphatic, aryl, or arylalkyl groups containing 1 to 20 carbon atoms. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having 1 to 20 carbon atoms. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, pyrenyl, tolyl, xylyl, mesityl, benzyl, and the like, including any heteroatom substituted derivative thereof.

Unless otherwise indicated, the term "substituted," when used to describe a chemical structure or moiety, refers to a derivative of that structure or moiety wherein one or more of its hydrogen atoms is substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), a primary amine, a secondary amine, a tertiary amine (such as alkylamino, arylamino, arylalkylamino), aryl, aryloxy, azo, carbamoyl (—NHC(O)O-alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, phosphodiester, sulfide, sulfonamido (e.g., $SO_2NH_2$, $SO_2NR'R''$), sulfone, sulfonyl (including alkylsulfonyl, arylsulfonyl and arylalkylsulfonyl), sulfoxide, thiol (e.g., sulfhydryl, thioether) or urea (—NHCONH-alkyl-).

The terms "a," "an," and "the" are intended to include plural alternatives, e.g., at least one. For instance, the disclosure of "a dienophile", "a substrate," "a reactant," and the like, is meant to encompass one, or mixtures or combinations of more than one dienophile, substrate, reactant, and the like, unless otherwise specified.

In the descriptions provided herein, the terms "includes," "is," "containing," "having," and "comprises" are used in an open-ended fashion, and thus should be interpreted to mean "including, but not limited to." When methods or systems are claimed or described in terms of "comprising" various components or steps, the methods or systems can also "consist essentially of" or "consist of" the various components or steps, unless stated otherwise.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in one embodiment, that the contacting of one or more carbon nanotubes with a dienophile occurs at a pressure of about 8 MPa to about 30 MPa. This range should be interpreted as encompassing pressures of about 8 MPa and about 30 MPa, and further encompasses "about" each of 9 MPa, 10 MPa, 11 MPa, 12 MPa, 13 MPa, 14 MPa, 15 MPa, 16 MPa, 17 MPa, 18 MPa, 19 MPa, 20 MPa, 21 MPa, 22 MPa, 23 MPa, 24 MPa, 25 MPa, 26 MPa, 27 MPa, 28 MPa, and 29 MPa, including any ranges and sub-ranges between any of these values.

The term "about", as used herein, refers to values that are within 5% of the indicated value. For example, "about 30 MPa" would encompass pressures of 28.5 MPa to 31.5 MPa.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

EXAMPLES

Example 1—Materials and Devices Preparation

Functionalization:

CNTs functionalized with maleic anhydride were prepared in this example through a Diels-Alder reaction via a solvent-free approach. The reactions of this example were conducted in a 500 mL Parr high-pressure batch reactor. The set-up included a high-pressure vessel, which allowed the gas-solid heterogeneous reactions to be studied.

In a typical run, MAH (12 g) and MWCNTs (2 g) were loaded into the high-pressure cell. A liquid phase of MAH was disposed at the bottom of the high-pressure cell, and the MWCNTs were placed on a filter plate, which separated the MWCNTs from the liquid phase of MAH.

After purging with $CO_2$ for half an hour, the reactor was heated and pressurized. Diels-Alder cycloaddition reactions were conducted at temperatures of about 130° C. to about 250° C., and under pressures of about 8 MPa to about 25 MPa, which led to different degrees of CNT functionalization (DF).

In this example, the highest DF achieved was about 4% (functional group/100 CNT-carbon), which was calculated by using TGA weight losses (see Example 2).

FIG. 1 depicts a schematic of an embodiment of a carbon nanotube functionalized with MAH. FIG. 2 depicts a possible mechanism for a reaction of this example. For clarity, FIG. 2 depicts only a portion of an embodiment of a carbon nanotube.

After 48 hours, the $CO_2$ was slowly released and the residual functionalized CNTs in the high-pressure cell were extracted three times with $CO_2$ (25 MPa, 90° C.) to remove unreacted (e.g., free) MAH. To ensure or improve purity, the prepared CNT-MAH was further washed with boiling acetone via Soxhlet extraction for 24 hours.

Preparation of Suspension:

The prepared CNT-MAH was easily dispersed in common polar organic liquids, including N-methyl-2-pyrrolidone (NMP), dimethylformamide (DMF), and dimethyl sulfoxide (DMSO), but the CNT-MAH of this example had a relatively low tolerance in hydrocarbons.

Stable nanotube suspensions having concentration of about 3 wt % to about 6 wt % were achieved in this example. These values are 30-60 times higher than the maximum achievable concentration with unfunctionalized MWCNT, and closer to the concentrations currently desired for wet-based industrial processes, which typically include concentrations of about 8 wt % to about 12 wt %.

Also, the absence of a conventional surfactant in the processes of this example was advantageous, at least because this feature eliminated the need for surfactant removal.

Specifically, in this example, a CNT suspension (1.4 g nanotubes and 20 mL NMP) was prepared by sonication in an ice bath using a COLE-PARMER® Misonix 3000 sonicator (45 W, 20 kHz) on a pulse model (10 s on/60 s off) for up to 30 min. After sonication, centrifugation (6000 rpm for 90 min) was used to remove the aggregated nanotubes from the CNT suspensions.

The nanotube concentration was determined by weighing a measured volume of the suspension before and after removing the solvent. Printed CNT strain sensors were prepared via a custom-designed 3-dimension inkjet printer. The flow rate of the suspension was controlled by gravity. Gas sensors were prepared by spray coating with BADGER Model 150 air brush.

The well-dispersed, high-concentration CNT suspensions of this example could be readily used as CNT fibers in wet spinning processes, which is a standard industrial practice.

Example 2—Characterization

Figure 3:
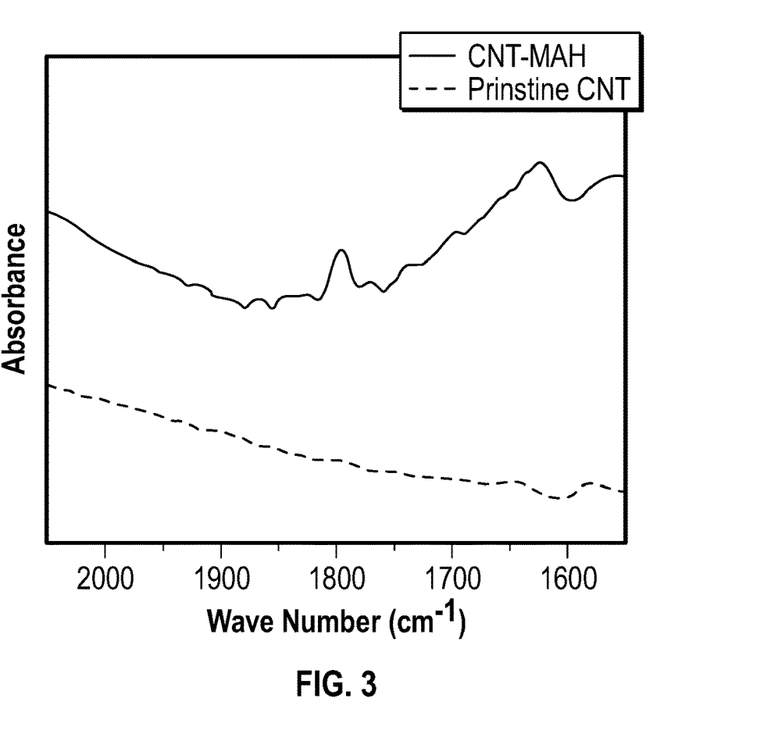
FIG. 3 depicts a Fourier transform infrared (FTIR) spectra of an embodiment of pristine nanotubes and an embodiment of carbon nanotubes functionalized with MAH.

The CNT-MAH prepared in Example 1 was charactered by thermal gravimetric analysis (TGA), transmission electro miscrocopy (TEM), Raman spectroscopy, and X-ray photoemission spectroscopy (XPS). Evidence of MAH functionalization was also observed in the FTIR spectra depicted at FIG. 3. FIG. 3 depicts a Fourier transform infrared (FTIR) spectra of prinstine nanotubes and CNT-MAH.

Prinstine nanotubes were compared with maleic anhydride-functionalized nanotubes (CNT-MAH), and the presence of MAH was confirmed by the occurrence of the characteristic peak at 1792 cm$^1$, which corresponds to the symmetric C=O stretching in succinic anhydride. More evidence for this functionalization came from XPS as explained herein.

The amount of oxygen increased after functionalization, while minor amounts of oxygen were present in the pristine nanotubes. The results indicated that the higher diffusivity and easy product separation in $scCO_2$ (compared to a conventional liquid medium) resulted in improved overall reaction rates and production efficiency without causing noticeable damage to the CNT structure (see FIG. 4A, FIG. 4B, and FIG. 7).

Also, the degree of functionalization was controlled by adjusting the reaction conditions. This can be important for practical applications, because the amount of functional group that is present is an important chemical variable, which may be tuned to achieve one or more properties, such as dispersion ability, compatibility, etc.

The morphology of samples was investigated by SEM (JEOL 7401F) and TEM equipped with cold-cathode field-emission gun (JEOL ARM-200cF-2010) respectively. Electron energy loss spectroscopy (EELS) was performed with a Gatan GIF Quantum image filter and spectrometer (Gatan, USA) at 80 kV. EELS data was acquired in the TEM Dual EELS mode with spot sizes of around 10 nm, convergence and collection semi-angles of approximately 9.2 and 10.4 mrads, respectively.

Figure 4A:
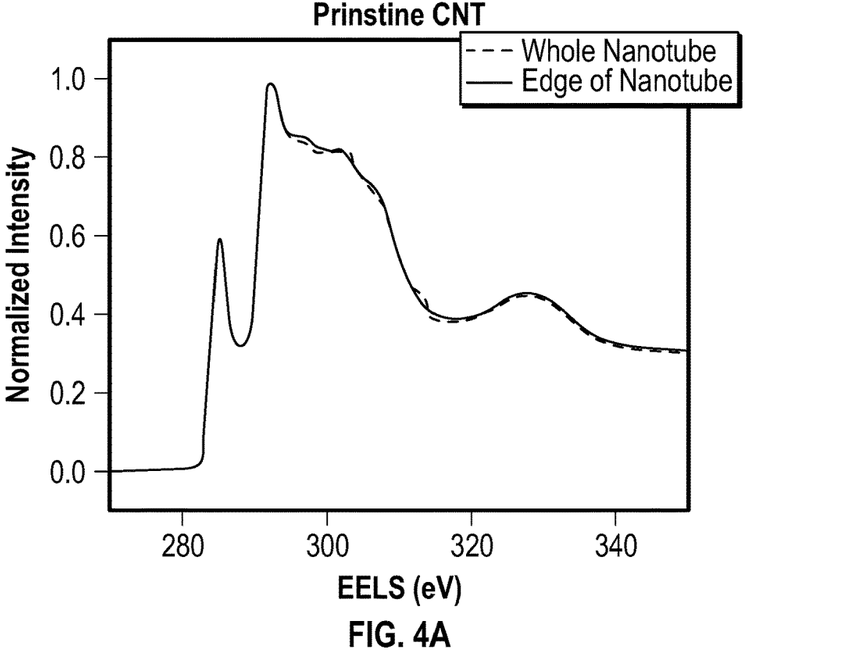
FIG. 4A depicts electron energy loss spectroscopy (EELS) data for an embodiment of pristine nanotubes.
Figure 4B:
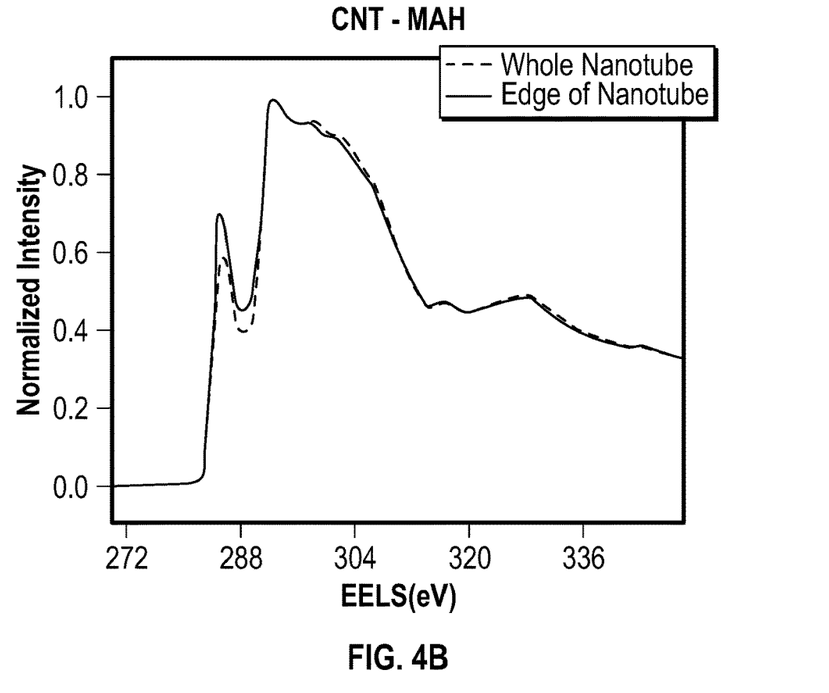
FIG. 4B depicts EELS data for an embodiment of carbon nanotubes functionalized with MAH.

FIG. 4A depicts EELS data for prinstine nanotubes, FIG. 4B depicts EELS data for CNT-MAH of Example 1.

EELS Analysis:

FIG. 4A and FIG. 4B show the carbon K-edge EELS of MWCNTs before and after functionalization with background subtraction and normalized to the 1 s–σ* peak. In the case of MWCNT, both 1 s–π* peak at ~286 eV and 1 s–σ* at ~293 eV were observed. Since sp3 bonding has no 1 s–π* peak, its reduced intensity was indicative of increased sp3 bonding and vice versa. Functionalization happened only on the surface layer of MWCNT and the inside of the graphene structures was substantially unchanged. FIG. 4B demonstrates that the overall EELS data of CNT-MAH were similar to those of pristine CNT.

The samples for TEM were prepared by ultrasonic dispersion in isopropyl alcohol. The samples were then placed on a copper TEM grid. XPS measurements were carried out in a PHI 5100 X-ray photoelectron spectroscopy with a Al Kα radiation source.

Figure 5:
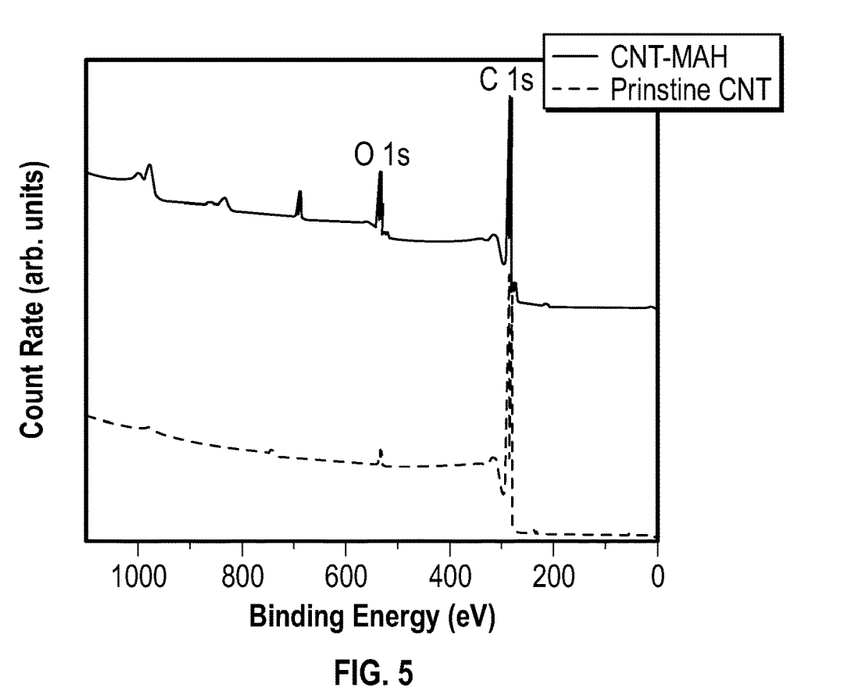
FIG. 5 depicts an X-ray photoemission spectroscopy (XPS) survey spectra of an embodiment of pristine nanotubes and an embodiment of carbon nanotubes functionalized with MAH.

FIG. 5 depicts an XPS survey spectra of prinstine nanotubes and the CNT-MAH of Example 1.

Thermogravimetric analyses were conducted on a TA 100 by heating the samples from 100° C. to 900° C. in nitrogen at 10° C. per minute.

Figure 6:
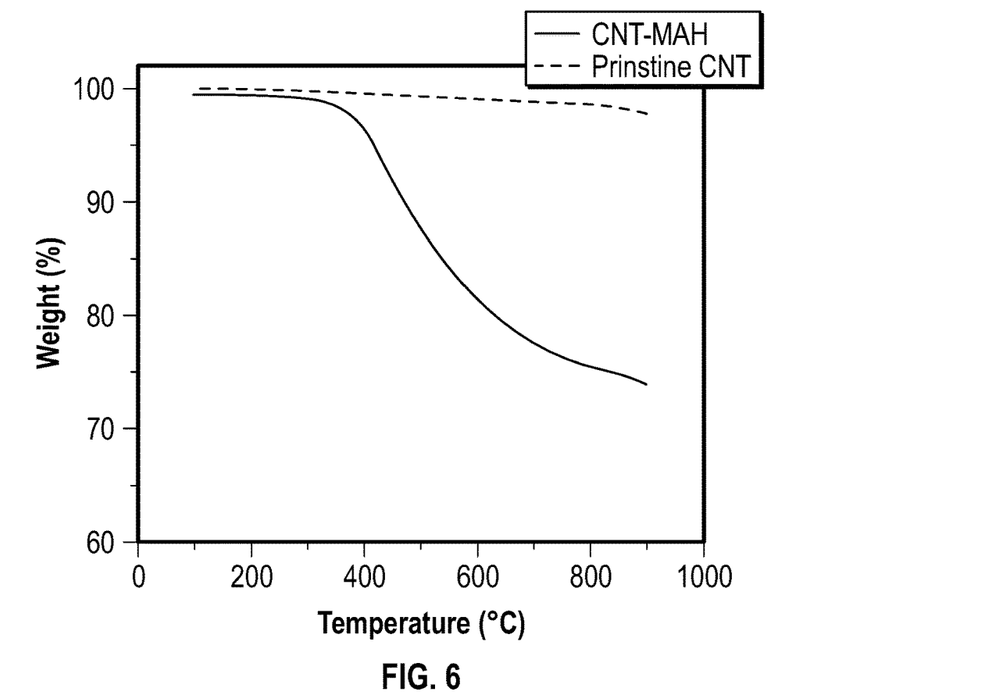
FIG. 6 depicts thermogravimetric analysis (TGA) thermograms obtained from an embodiment of pristine carbon nanotubes and an embodiment of carbon nanotubes functionalized with MAH.

FIG. 6 depicts TGA thermograms obtained from a heating rate of 10° C. per minute in nitrogen.

Estimating the Degree of Functionallization (DF) by Using TGA Weight Losses:

The DF was defined as the number of functional groups per 100 CNT-carbon. For the functionalized nanotubes, the amount of function group was calculated based on the mass loss ($W_s$ %) observed at 800° C. relative to the corresponding pristine nanotubes. The molar mass of the function group was $M_F$. The degree of functionallization (DF) was—

$$DF = \frac{W_s/M_F}{(100 - W_s)/12} \times 100 \quad (S1)$$

The Raman spectra were collected on a Raman microscope (inVia microscope, RENISHAW®) using 785 nm excitation. Luminescent properties were measured with a 488 nm excitation (inVia microscope, RENISHAW®).

Figure 7:
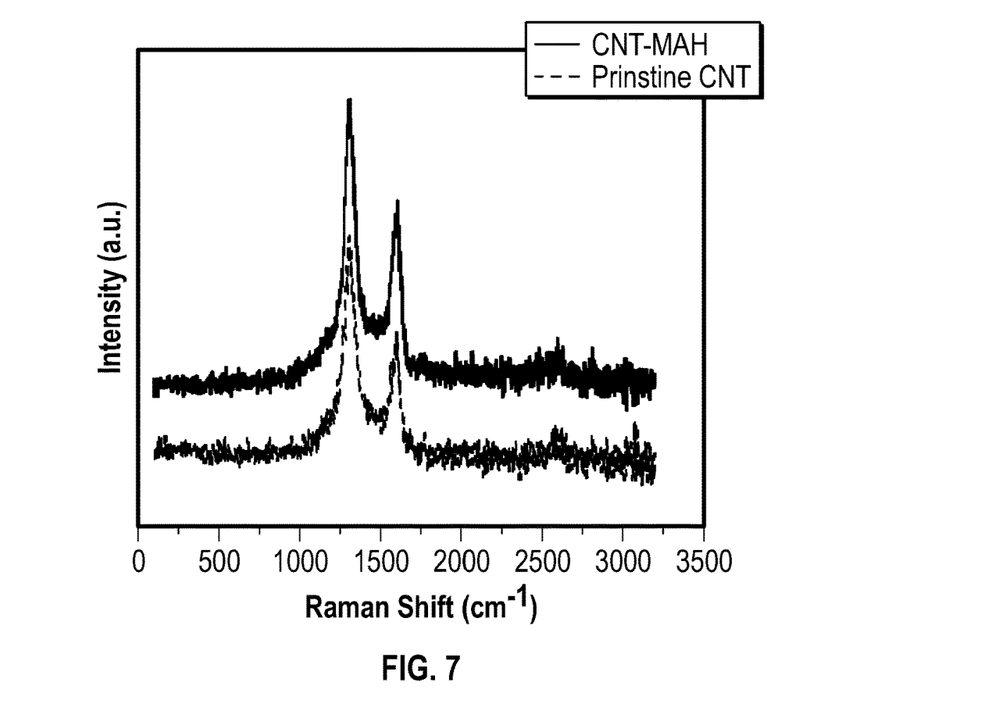
FIG. 7 depicts representative Raman spectra of pristine nanotubes and CNT-MAH of Example 1.

FIG. 7 depicts representative Raman spectra of prinstine nanotubes and CNT-MAH of Example 1.

Figure 8:
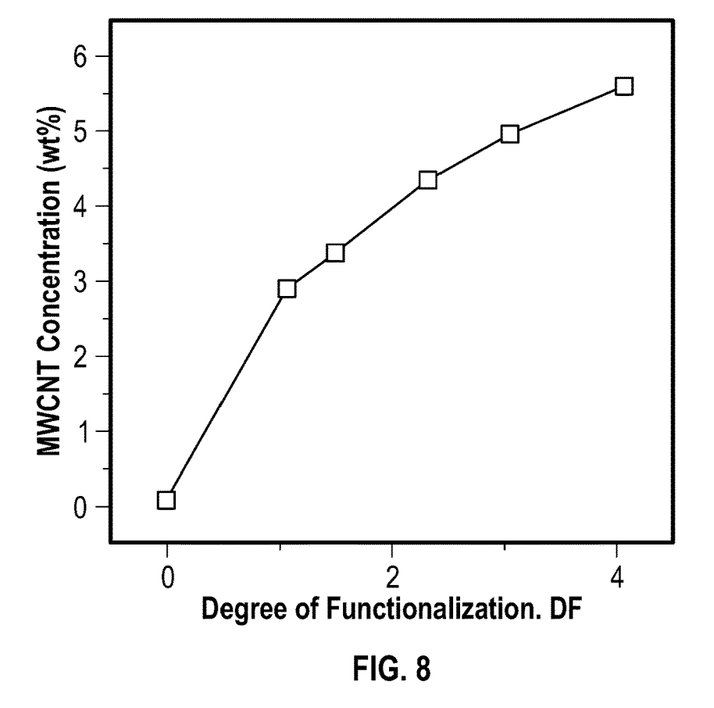
FIG. 8 depicts the effect of MAH contents on the dispersibility of an embodiment of carbon nanotubes in N-methylpyrrolidone.

FIG. 8 depicts the effect of MAH contents on the dispersion ability of carbon nanotubes in NMP. FIG. 8 shows that the dispersion ability of MWCNTs in NMP at room temperature depends on the degree of functionalization (DF) of the MWCNTs.

To further elucidate the structure of the CNT suspensions, small-angle X-ray scattering (SAXS) experiments were conducted at room temperature. Scattering profiles for CNT suspension (5 wt %) were collected. The observed $q^{-2}$ behavior over a q range from 0.4 to 0.9 nm$^{-1}$ implied that the isolated nanotubes formed a loose 3-D network compared with a polymer solution.

The well dispersed state of nanotubes in suspensions was further confirmed by an examination of luminescent properties of the dilutions from the stock CNT suspension (5 wt %).

Strong luminescence was observed upon exciting CNT suspensions ranging in concentration from 0.05 wt % to 5 wt %, which was a clear sign of well-dispersed nanotubes. The luminescent intensity was maximal at a concentration of 0.25 wt %, and then began to decrease with increasing CNT concentration. Not wishing to be bound by any particular theory, this may have occured because when the concentration of CNT increased, the interaction between the CNTs increased, leading to self-quenching, which decreased PL intensity. Such an interaction may be ascribed to the energy exchange and the electric dipole-dipole energy transfer processes.

SAXS measurements were obtained using a BRUKER® NanoSTAR system, operating at 45 kV and 650 mA with Its microfocus X-ray source (Cu Kα, A=0.15412 nm). The SAXS pattern was recorded by a HiStar 2D multi-wire area detector, and was corrected for background scattering from the empty cell and solvent.

Studies of the temperature dependence of luminescent properties of the CNT suspensions provided a classic tool to reveal the activation energy ($E_a$) associated with the luminescent quenching process.

Luminescence Quenching:

The concentration quenching behavior could be explained by Van Uitert's model (Equation S2). It was found from the fitting process that θ=3.89, which indicated that the exchange interaction and electric dipole-dipole interaction dominated the concentration quenching behavior.

$$\frac{I_C}{I_0} = \frac{1}{1 + \beta C^{\theta/3}} \quad (S2)$$

where C is the CNT concentration, β is constant for a certain system, and θ is a constant depending on the interaction mechanisms, $I_0$ is maximum luminescent intensity, and $I_C$ is the luminescent intensity at a CNT concentration of C. θ=3, 6, 8 or 10 for exchange, dipole-dipole, dipole-quadrupole or quadrupole-quadrupole interactions, respectively.

The thermal quenching could be described by an Arrhenius-type activation model as: [S2]

$$\frac{I_0 - I_T}{I_T} = Ae^{-E_a/k_BT} \quad (S3)$$

where $I_0$ is maximum luminescent intensity, $I_T$ is the luminescent intensity at given temperature, T, $E_a$ is the activation energy, $k_B$ is the Boltzmann's constant.

An Arrhenius plot of the normarized luminescent intensity, $(I_0-I)/I$, was prepared, and at each corresponding temperature for the CNT suspension (5 wt %), where $I_0$ is the maximum intensity and I is the intensity at given temperature, T. The measured activativation energies were about 2.4 eV, which was much higher than what was measured for unfunctionalized CNTs (~0.8 eV). This result suggests a stronger interaction between the NMP and CNT-MAH than for unfunctionalized CNT. The energy difference (~1.6 eV) was compariable to the electron affinity (~1.3 eV) of MAH as a charge transfer acceptor.

The remarkable energy increase for functionalized nanotubes could be ascribed to the formation of charge-transfer complexes between functionalized nanotubes with NMP. A rapid visual color change upon the mixing of the functionalized nanotubes was noticed, which could be regarded as evidence of the formation of a molecular complex. The luminescence of the CNT-MAH suspensions disappeared entirely above a critical temperature of about 55° C., suggesting that the homogeneous CNT-MAH suspensions separated into two phases. The CNT richer phase could be considered a semi-rigid network with strong physical cross-links, possibly due to the van der Waals force between CNTs. This result indicated that the CNT-MAH suspensions showed a temperature-induced phase separation (LCST) behavior.

The rheological behavior of a CNT-MAH suspension (5 wt %) was inspected in an oscillation mode by imposing heating from −5° C. to 50° C. The storage moduli increased slightly with increasing temperature at the first stage, and then sharply increased beyond about 45° C. This observed thermal transition was roughly consistent with the foregoing luminesce results.

Upon heating, the network underwent a change, wherein the isolated CNTs lost part of their affinity to the surrounding NMP, and subsequently started to bundle up into an aggregate network. The aggregation process could be considered a sol-to-gel transition, with considerably increased storage modulus (G') values. This LCST behavior observed in CNT suspensions was indicative of the negative enhalpy and entropy during the formation of CNT-NMP complexes, resulting from the formation of the stable suspensions of CNT in NMP.

The negative combinatorial entropy could be interpreted in terms of the formation of cylindrically organized NMP molecules at the nanotube interface, but also in terms of the negative change of free volume content. To test this hypothesis, the Lattice Fluid model with mean-field inteactions was considered to describe the phase behavior in CNT.

Figure 9:
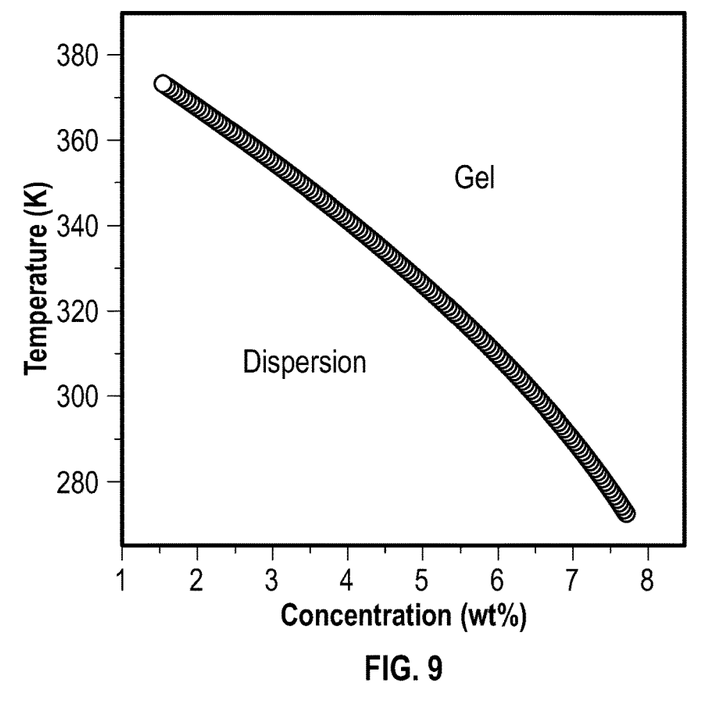
FIG. 9 depicts theoretical curves that illustrate an effect of carbon nanotube concentration on phase separation.

The calculated data was plotted, as depicted at FIG. 9, which shows theoretical curves that illustrate the effect of CNT concentration on phase separation. The tendency for phase seperation to occur increased rapidly with concentration. For example, a CNT dispersion of high concentration (~7 wt %) was unstable at room temperature. This physical model, albeit oversimplifield, can provide a conceptually useful picture of the CNT suspensions of this example.

Figure 10:
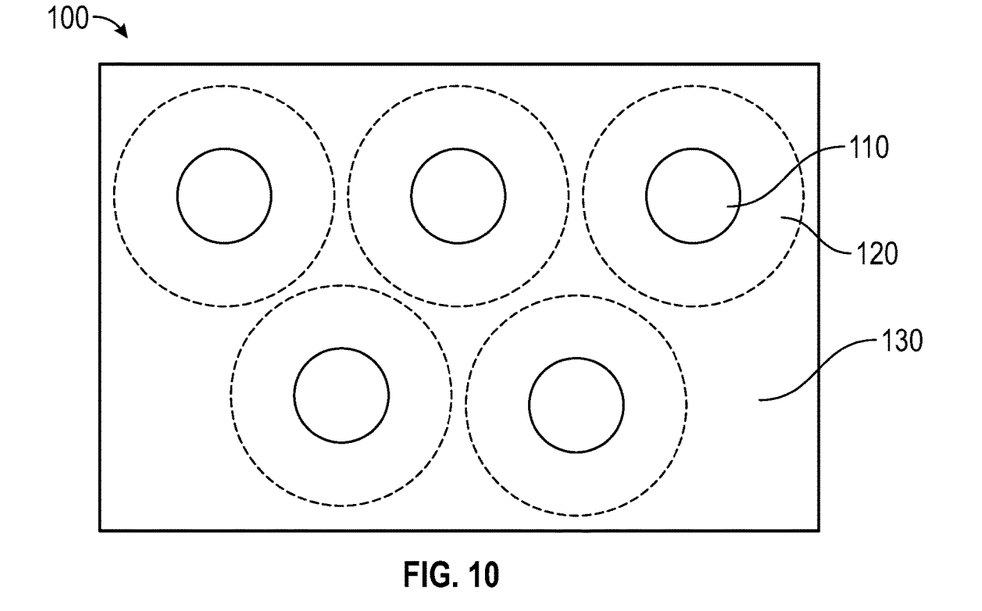
FIG. 10 depicts a schematic of a CNT domain phase model.

Prediction LCST Behavior of CNT Suspensions:

A CNT domain phase model was proposed to describe the phase behavior of CNT suspensions. A schematic of this model is depicted at FIG. 10. The schematic 100 of FIG. 10 represents the CNTs 110, and the proposed CNT dispersion phase 120 and NMP phase 130 in stable CNT suspension.

The following assumptions were used in the model of this example: (1) two phases existed in stable CNT suspensions (a CNT domain phase and a pure NMP phase); (2) in the CNT domain phase, the CNT was embedded in cavities formed by NMP molecules; (3) NMP molecules in the CNT domain phase had the same chemical potential; (4) the criterion for the formation of stable CNT suspensions was the existence of a pure NMP phase and the chemical potential of NMP in the CNT domain phase was equal to the chemical potential of NMP in a pure NMP phase, $\mu_{NMP}^{S} = \mu_{NMP}^{D}$.

The chemical potential of NMP was calculated by the Sanchez-Lacombe equation of state (SL EoS). The SL equation of state (SL EoS) is—

$$\tilde{\rho}^2 + \tilde{P} + \tilde{T}\left[\ln(1-\tilde{\rho}) + \left(1 - \frac{1}{r}\right)\tilde{\rho}\right] = 0 \quad (S4)$$

$\tilde{T}$, $\tilde{P}$ and $\tilde{\rho}$ are defined as $$\tilde{T} = \frac{T}{T^*}; \tilde{P} = \frac{P}{P^*}; \tilde{\rho} = \frac{\rho}{\rho^*} \quad (S5)$$

T*, P* and ρ* were the scaling parameters.

TABLE 1

Scaling parameters of NMP and CNT.

|     | P* (MPa) | ρ* (kg · m⁻³) | T* (K) |
|-----|----------|---------------|--------|
| NMP | 602.5    | 1128.1        | 575.5  |
| CNT | 39149    | 999           | 765    |

Table 1 shows the scaling parameters of NMP and CNT, which were obtained by fitting the PVT experimental data of NMP and CNT.

The number of lattice sites occupied by a molecule, r, was $$r = \frac{M_W P^*}{RT\rho^*} \quad (S6)$$

wherein R is the gas constant and $M_w$ is molecular weight.

For mixtures, the following mixing rules were used $$P^* = \sum_i \sum_j \phi_i \phi_j P_{ij}^*; T^* = P*\sum_i \frac{\phi_i^\circ T_i^*}{P_i^*}; \frac{1}{r} = \sum_i \frac{\phi_i^\circ}{r_i} \quad (S7)$$

$$\text{where } P_{ij}^* = (1 - \kappa_{ij})\sqrt{P_i^* P_j^*}\,; \phi_i = \left(\frac{w_i}{\rho_i^*}\right) / \sum_j \frac{w_j}{\rho_j^*}; \quad (S8)$$

$$\phi_i^\circ = \frac{\phi_i T_i^*}{P_i^*} / \sum_j \frac{\phi_j T_j^*}{P_j^*}$$

$\phi_i$ is the volume fraction of component i and $k_{ij}$ is the binary interaction parameter.

The chemical potential of NMP in the pure NMP phase and CNT domain phase were calculated, respectively:

$$\mu_{NMP}^S = r_{NMP}^0 RT\left[-\frac{\tilde{\rho}_{NMP}}{\tilde{T}_{NMP}} + \frac{\tilde{P}_{NMP}}{\tilde{\rho}_{NMP}\tilde{T}_{NMP}} + \right. \quad (S9)$$
$$\left.\left(\frac{1}{\tilde{\rho}_{NMP}} - 1\right)\ln(1 - \tilde{\rho}_{NMP}) + \frac{1}{r_{NMP}^0}\ln\tilde{\rho}_{NMP}\right]$$

$$\mu_{NMP}^D = RT\left[\ln\phi_{NMP} + \left(1 - \frac{r_{NMP}}{r_{CNT}}\right)\phi_{CNT} + \right. \quad (S10)$$
$$r_{NMP}^0\tilde{\rho}\frac{P_{NMP}^* + P_{CNT}^* - 2P_{12}^*}{\tilde{T}_{NMP}}\phi_{CNT}^D\right] +$$
$$r_1^0 RT\left[-\frac{\tilde{\rho}_{NMP}}{\tilde{T}_{NMP}} + \frac{\tilde{P}_{NMP}}{\tilde{\rho}\tilde{T}_{NMP}} + \left(\frac{1}{\tilde{\rho}} - 1\right)\ln(1-\tilde{\rho}) + \frac{1}{r_{NMP}^0}\ln\tilde{\rho}\right]$$

In this study, the interaction parameter, $k_{ij}$, was 0.1, and the molecular weight of nanotubes, $M_w$, was $10^6$.

The strain sensor performance was tested using a custom-made stretching machine with a high-accuracy linear stepping motor (A-LSQ075A, ZABAR®) in a temperature/humidity test chamber (Russells Technical Products).

High-concentration and/or stable CNT suspensions can be a factor in improving the performance of CNT-based sensors and composites. The absence of a conventional surfactant also can be desirable due at least to the fact that it eliminates the need for surfactant removal, and can allow reliable, high-quality CNT materials to be achieved.

Printed Sensors:

A CNT supension (5 wt %) was printed on a stretchable thermoplastic elastomer film for strain sensing applications.

The fabricated strain sensors had excellent stretchability, and top and cross-sectional SEM images indicated that the homogeneous nanotube layer had a thickcess of about 2 μm.

The resistance responses of the strain sensor under different levels of stretch/release cycle deformation stimulations were evaluated. Very high stretchability (about 400%) and sensitivity (up to 3000 in gauge factor) were observed, which indicated a strong adhesion between the CNT layer and the elastomer layer, likely due to the elimination of a surfacant.

A detailed SEM analysis of the stretched samples was performed, and the images revealed the prescence of an intermediate CNT/elastomer composite layer, which was likely formed by the penetration of elastomer molecules into nanotube networks.

This intermediate layer likely retarded the delamination, and maintained the percolating parthways of nanotubes under high stretch ratio (>200%). Further tests were carried out to investigate the frequency, humidity, and fatigue effect on the sensor performance. The data showed that the sensing performance difference was indiscernible, which indicated that the sensor maintained its initial performance properties over the range of experimental conditions.

The CNT suspensions were printed on a wide range of hydrophilic substrates having various shapes, sizes, and roughness. A prototype of a smart glove was fabricated by printing nanotubes onto a nitrile-type glove at the various positions (fingertips and finger joints). The gloves could be worn for pulse diagnosis and digital record. Five different versions of the piezoresistive strain sensors were printed, including linear, shear, chain, biaxial, and bridge versions.

A typical pulse signal was detected by pressing the wrist with a middle fingertip, and the pulse frequency of 68 heart beats min was obtained. The smart glove could detect the finger motion to recognize different gestures, potentially useful in the field of human-machine interfaces.

Also, the CNT suspension of this example could be printed on woven fabric, possibly providing a simple way to fabricate smart textiles. An elbow sleeve was fabricated, which could be used for capturing the motion of the elbow. The CNT suspension also could be used in the field of structural health monitoring.

The CNT suspension was directly printed on the surface of a glass fiber reinforced composite sample at different locations (i.e. locations L1-L5, with L3 being the center, and L2 and L4, L1 and L5 being symmetrically located away from the center position). This sample was tested in a three-point bending test. The resistance response for L1-L5 were compared, and the resistance response was collected under a bending load increased step-by-step from 0 to 70 N. The results indicated that the combination of a high-quality CNT suspension and convenient printing technology represents a desirable way to fabricate multifunctional hybrid materials.

Example 3—Modifying Anhydride Group

Besides increasing the dispersion ability of nanotubes, the reactive anhydride group of the examples herein offered a suitable platform for the study of molecular design on the surface of the nanotubes and for the development of other functional materials.

For this purpose, the anhydride was modified in this example with primary amine moieties, and the resulting materials were subjected to vapor sensing tests. The MAH functionalized CNTs of Example 1 were contacted with the following primary amine moieties: aniline, benezene-1,3-diamine, ethane-1,2-diamine, $N^1,N^1$-dimethylethane-1,2-diamine, and pyren-1-amine.

The vapor sensing tests were conducted with a custom-modified Janis Research VPF-100 cryostat system. A custom-developed LabVIEW program was used to record the real-time data for all sensing tests. The real-time resistance responses of the sensors were measured using a Keithley 2401 SourceMeter controlled by a custom LabVIEW program.

The gas sensers of this example were fabricated with spray coating process, which was performed on a polyimide film having comb-structure silver contacts.

The dark visual appearance of the polyimide film was an indication of a thin layer of nanotubes. A repeatability test of the sensors to 100 ppm of ammonia at 25° C. was performed, and the response of the CNT-based sensors upon exposure to various concentrations of ammonia also was determined and analyzed.

The plots indicated that the sensors exhibited a positive vapor coefficient with good reproductivity, and the sensor responses increased with increasing ammonia concentration from 20 ppm to 200 ppm.

The sensors including functionalized nanotubes were more sensitive to ammonia that the unfunctionalized MWCNT-based sensor. This may have been due to the improved affinity of ammonia to the function groups on the functionalized nanotube surfaces. This affinity can increase the adsorption of ammonia, which may have resulted in a greater distance between the individual nanotubes. Therefore, it was possible to identify various vapours according to the different characteristic interactions between the vapor molecules and the functionalized nanotubes.

Figure 11:
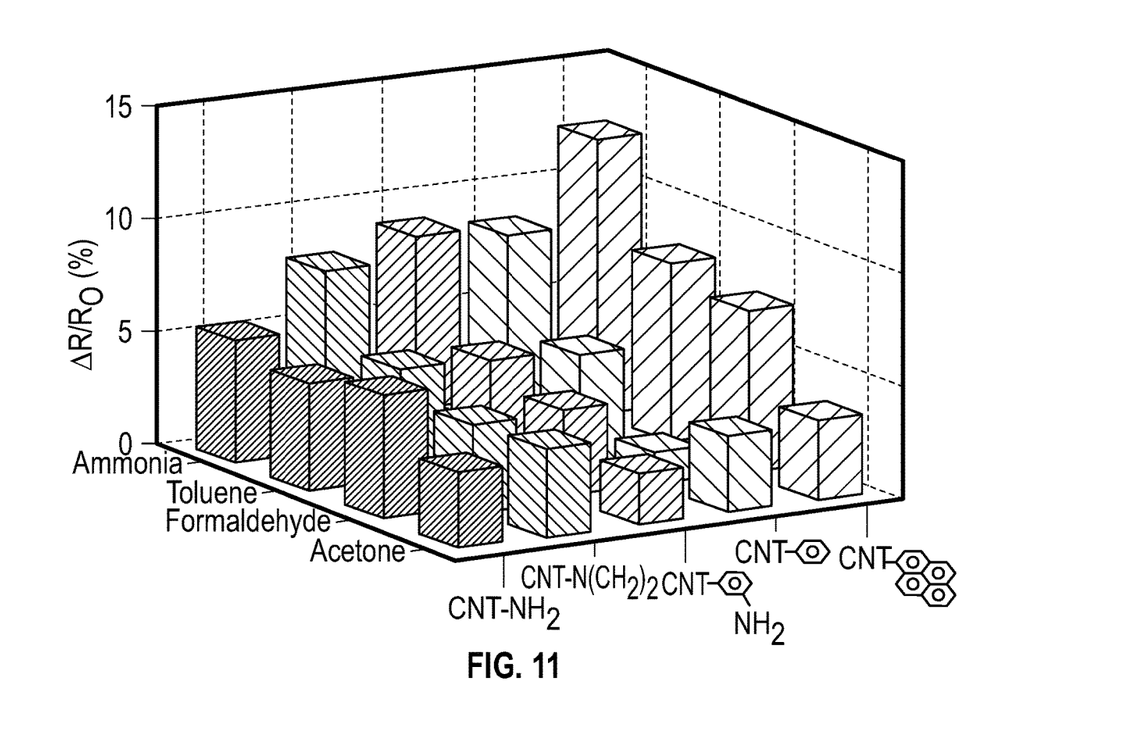
FIG. 11 depicts a resistance response of different embodiments of sensors after exposure to different organic vapors (100 ppm) at 25° C.

FIG. 11 depicts the resistance response of different sensors after exposure to different organic vapors (100 ppm) at 25° C. The data at FIG. 11 was based on the behavior of five kinds of functionalized CNTs towards four different chemical vapours with a concentration of 100 ppm at 25° C. Further investigation of the effect of concentrations on vapor selectrivity was conducted, and the data were analyzed by a principal component analysis (PCA) method, and demonstrated the concentration-independent selectivity of the CNT sensor array toward four vapors.

Fabrication of Gas Sensor:

Silver contacts for CNT gas sensors were fabricated on flexible Kapton polyimide substrates using Aerosol jet printing. The process used nitrogen ($N_2$) gas as both the atomizer and sheath gas. Controlled parameters were used to ensure continuous printing and homogenous deposition of silver nanoparticle ink. To ensure continuous ink flow the following values for printing each pattern were used: sheath: 100 ccm, impact exhaust: 600 ccm, atomizer: 700 ccm, plate temperature: 70-80° C., ink temperature: 25° C., printing velocity: 4 mm/s and tube temperature: 25° C.

The pneumatic atomizer enabled the ink particles (Ag nanoparticles dispersed in solvents) to atomize and create a mist, which then flowed through a channel that included the impactor, tube, and the deposition head.

While the sheath and impact exhaust/impactor could be described as flow controllers, increasing the pressures resulted in a decrease of ink flow. A combination of desirable parameters was determined for each kind of ink and substrate, but more than one combination of parameters may be suitable for one or more reasons (such as, acheiveing a desired thickness and/or resolution of printed lines).

The foreoing combination was chosen for this example because it provided steady and continuous ink flow for an extended time period (about 1 hour) without clogging or blocking the outlets. Also, the deposited ink thickness was suitable for printing the sensor contacts, and after sintering the electrical conductivity was good. The deposite ink also was thin enough to avoid compromising the resolution. In this example, the ink flow also was continuous in order to achieve an even deposition on the substrate.

Depositing CNT films on the substrate was carried out with BADGER Model 150 air brush, which was connected to an air compressor. During the spray process, the substrate was heated to 120° C. by a hot plate to accelerate the solvent evaporation. In this example, the atomizing gas pressure was kept below 0.2 MPa in order to achieve a reasonable spray pattern and prevent the gas flow from pushing away the droplets already on the substrate before completely drying.

Principal Component Analysis (PCA):

Principal component analysis (PCA) is a statistical tool that uses projections to transform large number of correlated random variables into smaller dimensions while retaining most of the information of the original dataset. The new variables (termed as principal components) are defined in such a way that the first variable includes the largest variance of the dataset, followed by second variable with second largest variance and so on. Thus, PCA was applied on a matrix having 16 rows and 5 columns where the responses were represented by $x_{ij}'$.

The relative responses $(R_{11}, R_{12} \ldots R_{mn})$ of the sensors $(S_1, S_2 \ldots S_n)$ for different gases $(G_1, G_2 \ldots G_n)$ were arranged in a m×n matrix (where, m=16, n=5). Relative responses for each gas were normalized between 0 and 1 using, $$\sum_{j=1}^{n} x_{ij}^2 = 1 \tag{S11}$$

$$i = 1, 2, \ldots m; j = 1, 2, \ldots n$$

where $$x_{ij} = \frac{R_{ij}}{\sqrt{\sum_{j=1}^{n} R_{ij}^2}} \tag{S12}$$

Normalized relative responses were then standardized for each sensor to make the mean and variance equal to 0 and 1, respectively, using following equation, $$x_{ij}' = \frac{x_{ij} - \bar{x}_j}{s_j} \tag{S13}$$

where, $\bar{x}_j$ is the mean of the normalized responses for each sensor and $s_j$ is the standard deviation which is given by, $$s_j = \sqrt{\frac{1}{m-1} \sum_{i=1}^{m} (x_{ij} - \bar{x}_j)^2} . \tag{S14}$$

Example 4—Functionalization of Buckypaper

Figure 12:
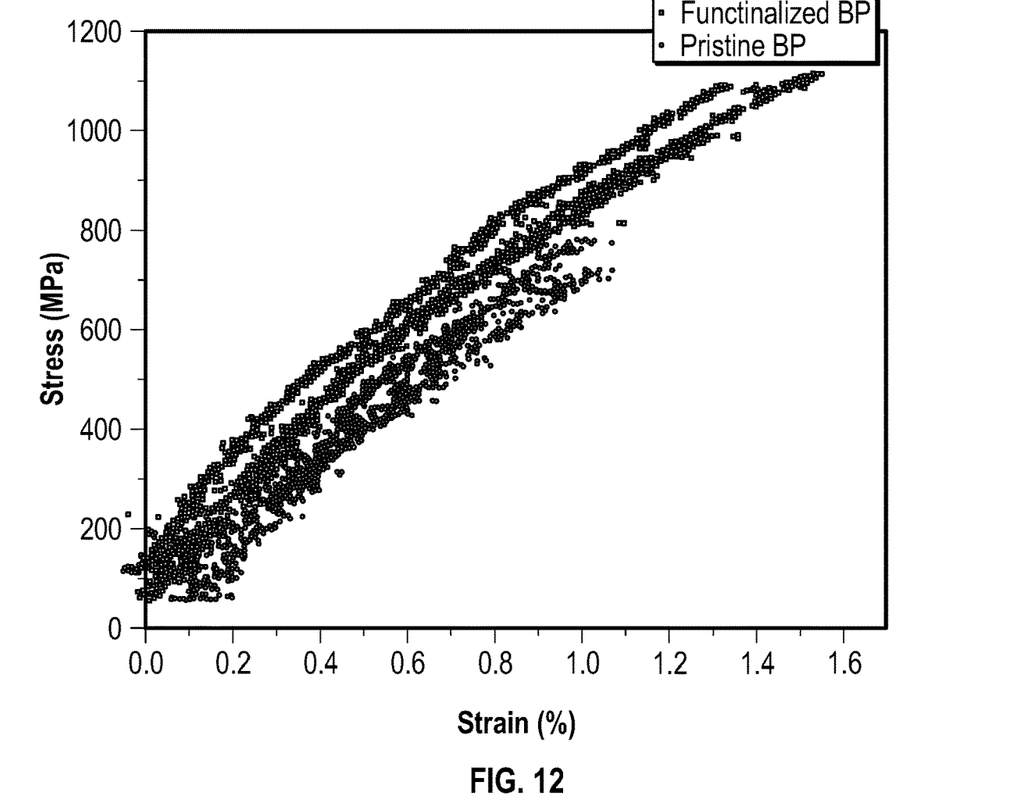
FIG. 12 depicts a plot of stress v. strain for an embodiment of a functionalized buckypaper and an embodiment of a pristine buckypaper.

A buckypaper was functionalized using a process similar to Example 1, and the process did not disturb the macroscopic structure of the buckypaper. FIG. 12 depicts a plot of strain (%) versus stress (MPa) for the functionalized buckypaper of this example.

We claim:

1. A method of functionalizing a carbon nanotube, the method comprising:
   contacting one or more carbon nanotubes with a dienophile in the presence of a supercritical fluid to form one or more functionalized carbon nanotubes.

2. The method of claim 1, wherein the one or more functionalized carbon nanotubes have a degree of functionalization of about 1% to about 5%.

3. The method of claim 1, wherein the dienophile comprises maleic anhydride, an alkenyl succinic anhydride, or a combination thereof.

4. The method of claim 1, wherein the supercritical fluid comprises supercritical carbon dioxide.

5. The method of claim 1, wherein the contacting of the one or more carbon nanotubes with the dienophile occurs at a temperature of about 130° C. to about 250° C.

6. The method of claim 1, wherein the contacting of the one or more carbon nanotubes with the dienophile occurs at a pressure of at least 20 MPa.

7. The method of claim 1, wherein the contacting of the one or more carbon nanotubes with the dienophile occurs at a pressure of about 8 MPa to about 30 MPa.

8. The method of claim 1, further comprising removing the dienophile from the one or more functionalized carbon nanotubes.

9. The method of claim 8, wherein the removing of the dienophile comprises contacting the one or more functionalized carbon nanotubes with carbon dioxide at (i) a pressure of about 20 MPa to about 30 MPa, and (ii) a temperature of about 80° C. to about 100° C.

10. The method of claim 1, wherein the one or more carbon nanotubes comprises one or more single-wall carbon nanotubes, one or more double-wall carbon nanotubes, one or more multi-wall carbon nanotubes, or a combination thereof.

11. The method of claim 1, wherein the one or more carbon nanotubes are in the form of a bulk material.

12. The method of claim 11, wherein the bulk material comprises a sheet, a foam, a fiber, or a combination thereof.

13. The method of claim 1, further comprising disposing the one or more functionalized carbon nanotubes in a liquid to form a suspension.

14. The method of claim 13, wherein the liquid comprises N-methyl-2-pyrrolidone (NMP), dimethylformamide (DMF), dimethyl sulfoxide (DMSO), or a combination thereof.

15. The method of claim 13, wherein the one or more functionalized carbon nanotubes are present in the suspension at an amount of about 0.1% to about 25% by weight, based on the weight of the suspension.

16. The method of claim 1, further comprising contacting the one or more functionalized carbon nanotubes with a reactant, wherein the reactant comprises (i) ammonia, or (ii) at least one primary amine.

17. The method of claim 16, wherein the reactant is selected from the group consisting of aniline, benzene-1,3-diamine, ethane-1,2-diamine, $N^1,N^1$-dimethylethane-1,2-diamine, pyren-1-amine, and a combination thereof.

18. A method of making a sensor, the method comprising:
   providing one or more functionalized carbon nanotubes made according to the method of claim 1; and
   disposing the one or more functionalized carbon nanotubes on a substrate.

19. The method of claim 18, wherein the disposing of the one or more functionalized carbon nanotubes comprises printing the one or more functionalized carbon nanotubes on the substrate.

20. A functionalized carbon nanotube, wherein the functionalized carbon nanotube comprises a surface to which at least one dihydrofuran-2,5-dione moiety is covalently bonded.

21. A sensor comprising:
   a substrate; and
   the functionalized carbon nanotube of claim 20, wherein the functionalized carbon nanotube is disposed on the substrate; and
   wherein the sensor is configured to provide a resistance response when (i) the sensor is subjected to a strain, or (ii) the functionalized carbon nanotube chemically reacts with a gas.

22. The sensor according to claim 21, wherein the substrate is flexible.

23. A derivative of a functionalized carbon nanotube, wherein the derivative of a functionalized carbon nanotube comprises a surface to which at least one 1-($C_1$-$C_{20}$ hydrocarbyl)pyrrolidone-2,5-dione moiety is covalently bonded.

24. The derivative of a functionalized carbon nanotube of claim 23, wherein the $C_1$-$C_{20}$ hydrocarbyl group is selected from the group consisting of phenyl, phenyl substituted with a primary amine, ethyl substituted with a primary amine, ethyl substituted with a tertiary amine, and pyrenyl.

* * * * *